United States Patent Office 3,162,691
Patented Dec. 22, 1964

3,162,691
PROCESS FOR THE MANUFACTURE OF
β-NITROETHANOL
Cyril Grob, Basel, and Erwin F. Jenny, Riehen, Switzerland, assignors to Ciba Corporation, a corporation of Delaware
No Drawing. Filed Mar. 14, 1960, Ser. No. 14,532
Claims priority, application Switzerland, Mar. 26, 1959, 71,328
6 Claims. (Cl. 260—638)

The present invention relates to a new process for the manufacture of β-nitroethanol.

Various processes for the manufacture of β-nitroethanol from formaldehyde, or substances yielding formaldehyde, and excess nitromethane in the presence of a basic condensing agent are known. Depending on the process, potassium carbonate, potassium hydroxide or calcium hydroxide is used, viz. for—

| | | |
|---|---|---|
| 1,045 molar equivalents of nitromethane. | 1 equivalent (=0.5 molar equivalent) of potassium carbonate. | I. M. Gorsky & S. P. Makarow Ber. 67, 996 (1934). |
| 170 molar equivalents of nitromethane. | 1 molar equivalent of potassium hydroxide. | J. Controulis, M. C. Rebstock & H. M. Crooks, J. Am. Chem. Soc. 71, 2463 (1949). |
| 45 molar equivalents of nitromethane. | 1 equivalent (=0.5 molar equivalent) of calcium hydroxide. | German Patent Appln. 1,046,600 filed February 24, 1956 by Deutsche Gold- und Silber-Scheideanstalt vormals Roessler. |

After the reaction is complete, the nitroethanol is isolated by fractionation, either directly or after neutralizing the basic condensing agent. For the neutralization there are used for—

| | | |
|---|---|---|
| 1 equivalent (=0.5 molar equivalent) of potassium carbonate. | 1 equivalent (=0.5 molar equivalent) of concentrated sulfuric acid. | Gorsky, see above. |
| 1 molar equivalent of potassium hydroxide. | 1.2 equivalents (0.6 molar equivalent) of concentrated sulfuric acid. | Controulis, see above. |

These processes involve risk owing to the danger of explosion, or, as is the case with the procedure of German patent application 1,046,600, filed February 24, 1956, by Deutsche Gold- und Silber-Scheideanstalt vormals Roessler, are cumbersome. The latter process also gives poor yields.

The present invention provides a simple process, which, even when carried out with large quantities, is explosion-proof and gives good yields of β-nitroethanol. According to this process in the absence of a substantial quantity of water acid-free nitromethane is reacted with formaldehyde or a substance yielding formaldehyde in the presence of a basic condensing agent, at least 9000 molar equivalents of nitromethane being used for 1 molar equivalent of basic condensing agent, the reaction is carried out at a temperature below 50° C. and the reaction mixture acidified before fractionation, 3 to 6.5 equivalents of an acidic agent being used for 1 equivalent of basic condensing agent.

The process should be carried out as far as possible with the exclusion of water, but the reactants need not be specially dried. The condensation is performed preferably at room temperature or at a slightly raised temperature, i.e., 25–35° C. The nitromethane should be substantially acid-free. The formaldehyde is used either as such (in gaseous form) or in the form of a substance yielding formaldehyde, such as para-formaldehyde.

Basic condensing agents are, for example, oxides, hydroxides, alcoholates, carbonates of alkaline earth metals or alkali metals, ammonium hydroxide or quaternary ammonium bases. They are used as far as possible in anhydrous form; especially suitable are alcoholic solutions of alkali metal hydroxides, such as methanolic potassium hydroxide solution. For acidification there are used organic or inorganic acids which are as far as possible anhydrous or contain little water, for example glacial acetic acid, citric acid, phosphoric acid, hydrochloric acid, especially concentrated sulfuric acid, or acid salts, such as for example calcium bicarbonate or sodium bisulfate.

A favourable modification of the new process consists in reacting a mixture of acid-free nitromethane and para-formaldehyde in the approximate molar ratio 11:1 with potassium hydroxide. As reaction temperature there is advantageously chosen a temperature between 0 and 35° C., preferably room temperature. After the reaction, the reaction mixture is acidified with concentrated sulfuric acid, 6.1 equivalents (=3.05 molar equivalents) of concentrated sulfuric acid being used for 1 equivalent of base. In this new process there are preferably used for—

| | | |
|---|---|---|
| 9,600 molar equivalents of nitromethane. | 1 molar equivalent of potassium hydroxide. | 6.1 equivalents (=3.05 molar equivalents) of concentrated sulfuric acid. |

The potassium sulfate precipitating on neutralisation is removed by filtration through kieselguhr. The resulting filtrate is completely stable under the conditions used for the isolation of nitroethanol.

The following example illustrates the invention.

Example

To a suspension of 468 grams of dry para-formaldehyde in 9.36 liters of acid-free nitromethane stirred in an open vessel at room temperature there are added 6.0 cc. of 3 N-methanolic potassium hydroxide solution in one portion. In the course of the reaction which takes a very mild course the mixture becomes completely clear. The mixture is then allowed to stand for 30 minutes at room temperature, acidified with 3.0 cc. of concentrated sulfuric acid with stirring, and stirring is then continued for 30 minutes at room temperature. The filtrate is suction-filtered through kieselguhr and evaporated at 35–40° C. in a water-jet vacuum. The excess of nitromethane distilling off can be used for further batches without any additional treatment. The resulting residue is then distilled in a water-jet vacuum at a bath temperature of 120–140° C., 600–700 grams of colorless β-nitroethanol boiling at 102–105° C. under 14 mm. of pressure being obtained. The pale brown residue is allowed to cool in vacuo, is then diluted with water and discarded.

What is claimed is:

1. In the process of manufacturing β-nitroethanol by reacting nitromethane with a member selected from the group consisting of formaldehyde and a substance yielding formaldehyde, in the presence of a basic condensing reagent selected from the group consisting of alkaline earth metal oxide, alkaline earth metal hydroxide, alkaline earth metal alcoholate, alkaline earth metal carbonate, alkali metal carbonate, ammonium hydroxide and quaternary ammonium base, and in the absence of a substantial amount of water, and treating the reaction mixture with an acidic reagent selected from the group consisting of acetic, citric, phosphoric, hydrochloric, sulfuric, calcium bicarbonate and sodium bisulfate, the steps of using at least 9000 molar equivalents of acid-free nitromethane per one molar equivalent of the basic condensing reagent, carrying out the reaction between 0° and 50°, and acidifying the reaction mixture with from 3 to 6.5 molar equivalents of the acidic reagent per one molar equivalent of the basic condensing reagent.

2. Process as claimed in claim 1, wherein methanolic potassium hydroxide solution is used as basic catalyst.

3. Process as claimed in claim 1, wherein the reaction is carried out at a temperature between 0 and 35° C.

4. Process as claimed in claim 1, wherein the reaction mixture is acidified with concentrated sulfuric acid.

5. Process as claimed in claim 4, wherein 6.1 equivalents of concentrated sulfuric acid are used per one equivalent of basic condensing agent.

6. In the process for manufacturing β-nitroethanol by reacting nitromethane with paraformaldehyde, in the presence of potassium hydroxide in methanol and in the absence of a substantial amount of water, and treating the reaction mixture with concentrated sulfuric acid, the steps of using about 9600 molar equivalents of acid-free nitromethane and about 865 molar equivalents of paraformaldehyde per one molar equivalent of potassium hydroxide, carrying out the reaction at room temperature, and acidifying the reaction mixture with about 2.05 molar equivalents of concentrated sulfuric acid.

References Cited in the file of this patent
UNITED STATES PATENTS

| | | |
|---|---|---|
| 2,135,444 | Vanderbilt | Nov. 1, 1938 |
| 2,139,120 | Hass et al. | Dec. 6, 1938 |

OTHER REFERENCES

Gorski et al.: Ber. Deut. Chem., 67 (996–1000) 1934.
Germany, 1,046,600, December 18, 1958 (Kl. 120 5/04), 2 pages spec.